(12) United States Patent
Pettinato

(10) Patent No.: US 6,489,746 B1
(45) Date of Patent: Dec. 3, 2002

(54) RECHARGEABLE REMOTE CONTROL

(76) Inventor: Dana M. Pettinato, 20 Peach St., Jamestown, NY (US) 14701-3712

( * ) Notice: Subject to any disclaimer, the term of this patent is extended or adjusted under 35 U.S.C. 154(b) by 49 days.

(21) Appl. No.: 09/824,182

(22) Filed: Apr. 3, 2001

(51) Int. Cl.[7] ................................................. H02J 7/02
(52) U.S. Cl. ........................................................ 320/111
(58) Field of Search ................................ 320/111, 107; 455/403, 414, 421, 422

(56) References Cited

U.S. PATENT DOCUMENTS

| | | | |
|---|---|---|---|
| 3,519,914 A | 7/1970 | Fujimaki et al. | 320/111 |
| 4,091,318 A | 5/1978 | Eichler et al. | 320/113 |
| 4,191,917 A | 3/1980 | Brown et al. | 320/111 |
| 4,673,861 A | 6/1987 | Dubovsky et al. | 320/114 |
| 4,709,201 A * | 11/1987 | Schaefer et al. | 320/112 |
| 5,122,721 A | 6/1992 | Okada et al. | 320/111 |
| 5,144,217 A * | 9/1992 | Gardner et al. | 320/110 |
| D338,673 S | 8/1993 | Lewis | D14/218 |
| 5,510,694 A | 4/1996 | Nilssen | 320/107 |
| 5,635,814 A | 6/1997 | Afzal et al. | 320/111 |
| 5,686,810 A | 11/1997 | Yasui | 320/113 |
| D404,840 S | 1/1999 | Van Deursen et al. | D26/49 |
| 5,923,147 A | 7/1999 | Martensson | 320/111 |
| 5,973,475 A | 10/1999 | Combaluzier | 320/107 |
| 5,982,140 A | 11/1999 | Toya et al. | 320/110 |
| 6,040,680 A | 3/2000 | Toya et al. | 320/108 |
| 6,127,941 A | 10/2000 | Van Ryzin | 340/825.69 |
| 6,405,049 B2 * | 6/2002 | Herrod et al. | 455/517 |

FOREIGN PATENT DOCUMENTS

WO WO 95/20828 8/1995

* cited by examiner

*Primary Examiner*—Edward H. Tso
*Assistant Examiner*—Pia Tibbits
(74) *Attorney, Agent, or Firm*—Richard C. Litman (57) ABSTRACT

The rechargeable remote control is a remote control device for a television, VCR, or the like with a built in battery charger for recharging the batteries of the remote control. The remote control is powered by rechargeable batteries, preferably nickel cadmium batteries. A battery charger circuit is mounted on a printed circuit board within the remote control housing and is electrically connected to the battery holder. The charger circuit receives power from the a.c. power mains through a retractable wall plug built into the remote control housing. The retractable wall plug is mounted on a rotor with a cam which operates a switch disconnecting the batteries from the remote control circuitry while the batteries are recharging. A first LED indicates the unit is ready for charging, and an optional second LED indicates that the batteries are receiving a recharging current.

6 Claims, 7 Drawing Sheets

RECHARGEABLE REMOTE CONTROL

BACKGROUND OF THE INVENTION

1. Field of the Invention

The present invention relates to a remote control device for a television or video cassette recorder (VCR) which operates on rechargeable batteries, and particularly to a remote control device with a built-in charging device for recharging the batteries.

2. Description of the Related Art

Virtually all television receivers, video cassette recorders and digital video disc (DVD) players are now manufactured with the capacity to operate by remote control. The remote control device may be a proprietary device manufactured by the maker of the television, VCR or DVD, or it may be a universal remote control designed to operate with more than one brand name appliance. The remote control is usually designed to transmit a modulated infrared signal which is received by the appliance. The transmitter is supplied with electrical power by one or more batteries. In order to avoid the expense of buying new batteries, the distributor or the consumer may use rechargeable batteries instead of disposable dry cell batteries.

Eventually the rechargeable battery runs down and requires recharging. Battery powered electrical devices may be designed in several different ways. The battery powered device may have only a battery compartment, without any provision built into the device for recharging the batteries. In this event, the user must remove the rechargeable batteries from the device and insert the batteries into a general purpose battery charger purchased separately from the device. A charger of this type is shown in U.S. Pat. No. 5,982,140, issued Nov. 9, 1999 to Toya et al.

The battery powered electrical device may have a removable battery pack which has circuitry incorporated into the battery pack for recharging the batteries. Examples of this approach are shown in U.S. Pat. No. 4,191,917, issued Mar. 4, 1980 to Brown et al (battery pack with retractable prongs for plugging into wall outlet); U.S. Pat. No. 5,635,814, issued Jun. 3, 1997 to Afzal et al. (battery module which attaches to charger having retractable prongs for attachment to device or wall receptacle); U.S. Pat. No. 5,686,810, issued Nov. 11, 1997 to T. Yasui (battery charger which fits into console which has mechanism for moving charging electrodes away from battery pack electrodes when charging is complete); U.S. Pat. No. 6,040,680, issued Mar. 21, 2000 to Toya et al. (battery pack with secondary coil for inductive coupling to primary coil in charger); PCT No. WO 95/20828, published Aug. 3, 1995 (battery charger for portable telephone) and U.S. Pat. No. 5,122,721, issued Jun. 16, 1992 to Okada et al. (battery pack may be placed in console charger, or charger may be plugged into device for AC power source).

Often a wall transformer or the entire charging unit plugs into a wall receptacle and is supplied with a pin that plugs into a jack in the battery pack to provide an appropriate current for recharging the device. Examples of this variation are shown in U.S. Pat. No. 6,127,941, issued Oct. 3, 2000 to J. M. Van Ryzin (remote control with graphical user interface) and U.S. Pat. No. 5,923,147, issued Jul. 13, 1999 to N. Martensson (charger itself is plugged into wall receptacle and pin is attached to cord mounted on retractable reel).

In a third approach, the battery powered electrical device may be provided with a desk console or wall mounted charging unit that the device may be inserted into. In this case the housing of the device often will have built-in terminals which are connected to the rechargeable batteries, or terminals on the battery holder. An example of this type of device is shown in U.S. Pat. No. 3,519,914, issued Jul. 7, 1970 to Fujimaki et al (carry case that device fits into for charging). In another variation, the console may be connected to a vehicle's automotive battery. This setup is frequently used to permit a portable radio to be used as a mobile radio, or to recharge the radio's batteries. Examples of this approach is shown in U.S. Pat. No. 4,091,318, issued to Eichler et al. on May 23, 1978, and in U.S. Pat. No. 4,673,861, issued Jun. 16, 1987 to Dubovsky et al.

In a fourth approach, the battery powered electrical device may have the charger circuitry built into the device. In this case, the charger circuitry may be powered through a zip cord with a wall outlet plug at the end of the cord, or the device may have a retractable wall outlet plug built into the device housing.

In a fifth approach, the battery powered electrical device may be recharged using a solar powered battery recharger which may either be built into the device housing, or which is a desk console unit which attaches to the device through a cord terminating in an appropriate plug.

Other battery charging devices are shown in U.S. Des. Pat. No. 338,673, issued Aug. 24, 1993 to D. Lewis (ornamental design for combine remote control and recharger); U.S. Pat. No. 5,510,694, issued Apr. 23, 1996 to O. K. Nilssen (automotive battery with built-in battery inverter/charging circuit for charging other batteries); and U.S. Pat. No. 5,973,475, issued Oct. 26, 1999 to P. M. Combaluzier (battery pack for cellular telephone with microcontroller and related circuitry for enabling keypad to be used as remote control).

The Coleman Company, Inc. of Wichita Kans. markets a rechargeable flashlight, Model No. 5387D700. The flashlight housing is the subject of U.S. Pat. No. Des. 404,840, issued Jan. 26, 1999 to Van Deursen et al. Although not shown in the '840 patent, the base of the housing includes a retractable wall plug so that the flashlight may be plugged into a wall outlet to recharge the flashlight's two AA NiCad batteries. The charging circuit for the flashlight is described below.

None of the above inventions and patents, taken either singularly or in combination, is seen to describe the instant invention as claimed. Thus a rechargeable remote control solving the aforementioned problems is desired.

SUMMARY OF THE INVENTION

The rechargeable remote control is a remote control device for a television, VCR, or the like with a built in battery charger for recharging the batteries of the remote control. The remote control is powered by rechargeable batteries, preferably nickel cadmium batteries. A battery charger circuit is mounted on a printed circuit board within the remote control housing and is electrically connected to the battery holder. The charger circuit receives power from the a.c. power mains through a retractable wall plug built into the remote control housing. The retractable wall plug is mounted on a rotor with a cam which operates a switch disconnecting the batteries from the remote control circuitry while the batteries are recharging. A first LED indicates the unit is ready for charging, and, optionally, a second LED indicates that the batteries are receiving a recharging current.

Accordingly, it is a principal object of the invention to provide a remote control unit with a built-in battery charger circuit.

It is another object of the invention to provide a remote control unit with a built-in battery charger which requires no external wiring or cables for connection to a power source.

It is a further object of the invention to provide a remote control unit with a retractable wall plug for connecting a built-in battery charging circuit to the a.c. power mains which includes an indicator light to indicate that the remote control circuitry has been disconnected from the battery power supply when the wall plug is extended to prevent accidental damage to the remote control unit circuitry.

Still another object of the invention is to provide a remote control unit with a built-in battery charger having an indicator light which indicates when the batteries are receiving a charging current.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a rechargeable remote control, designated generally as 10 in the drawings. The device 10 is a conventional remote control, except that the remote control unit has been modified to include a battery charger circuit for recharging the remote control's battery power supply. The battery charger circuit is contained within the housing of the remote control unit, and the exterior housing has been modified to include a retractable wall plug for connecting the battery charging circuit to the a.c. power mains. Thus, the rechargeable remote control 10 may be plugged directly into a wall outlet for recharging the batteries, without the necessity of a console charging unit or attaching a transformer or cabling to the rechargeable remote control unit 10.

Figure 1:
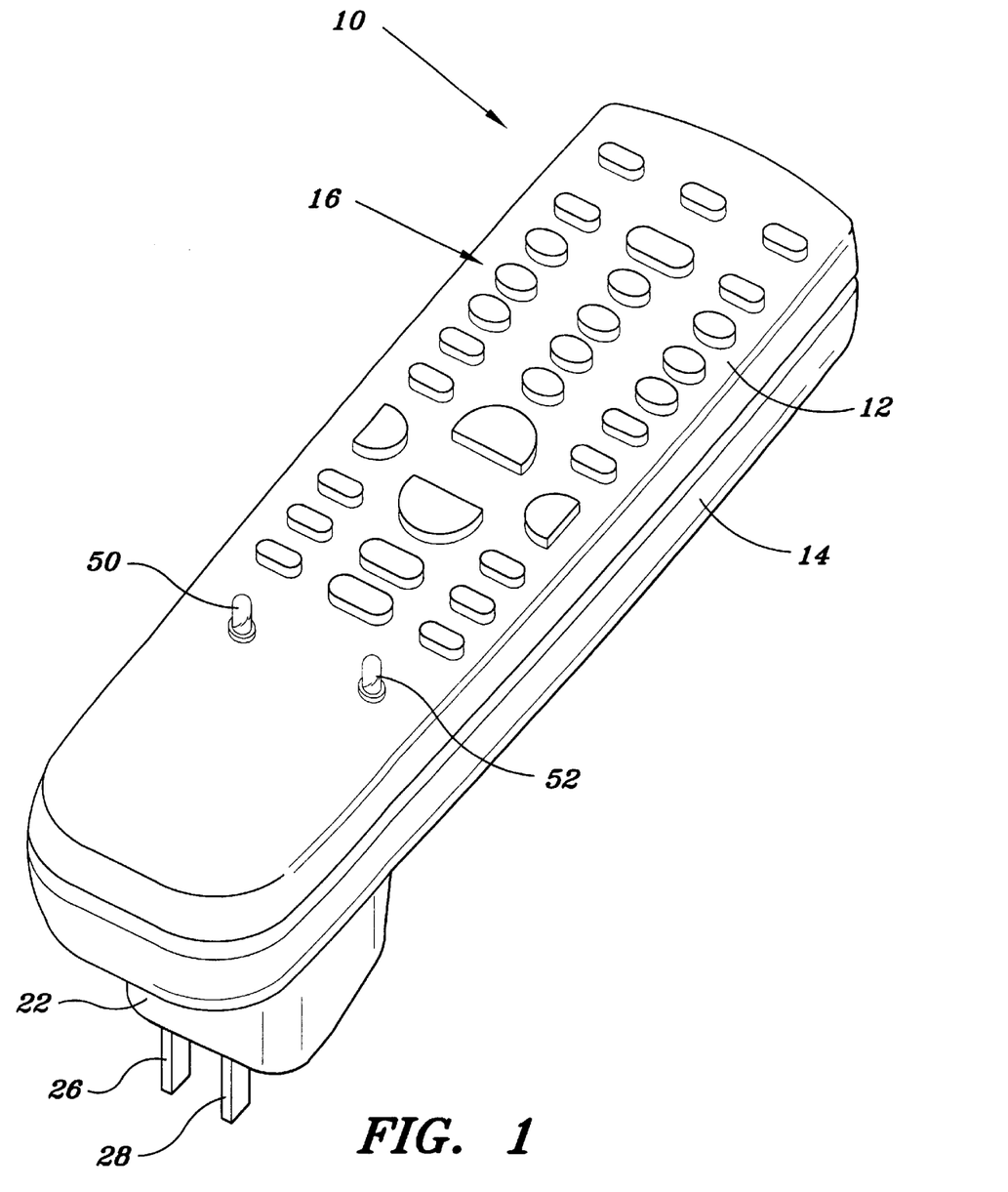
FIG. 1 is an perspective view of a rechargeable remote control according to the present invention.
Figure 2:
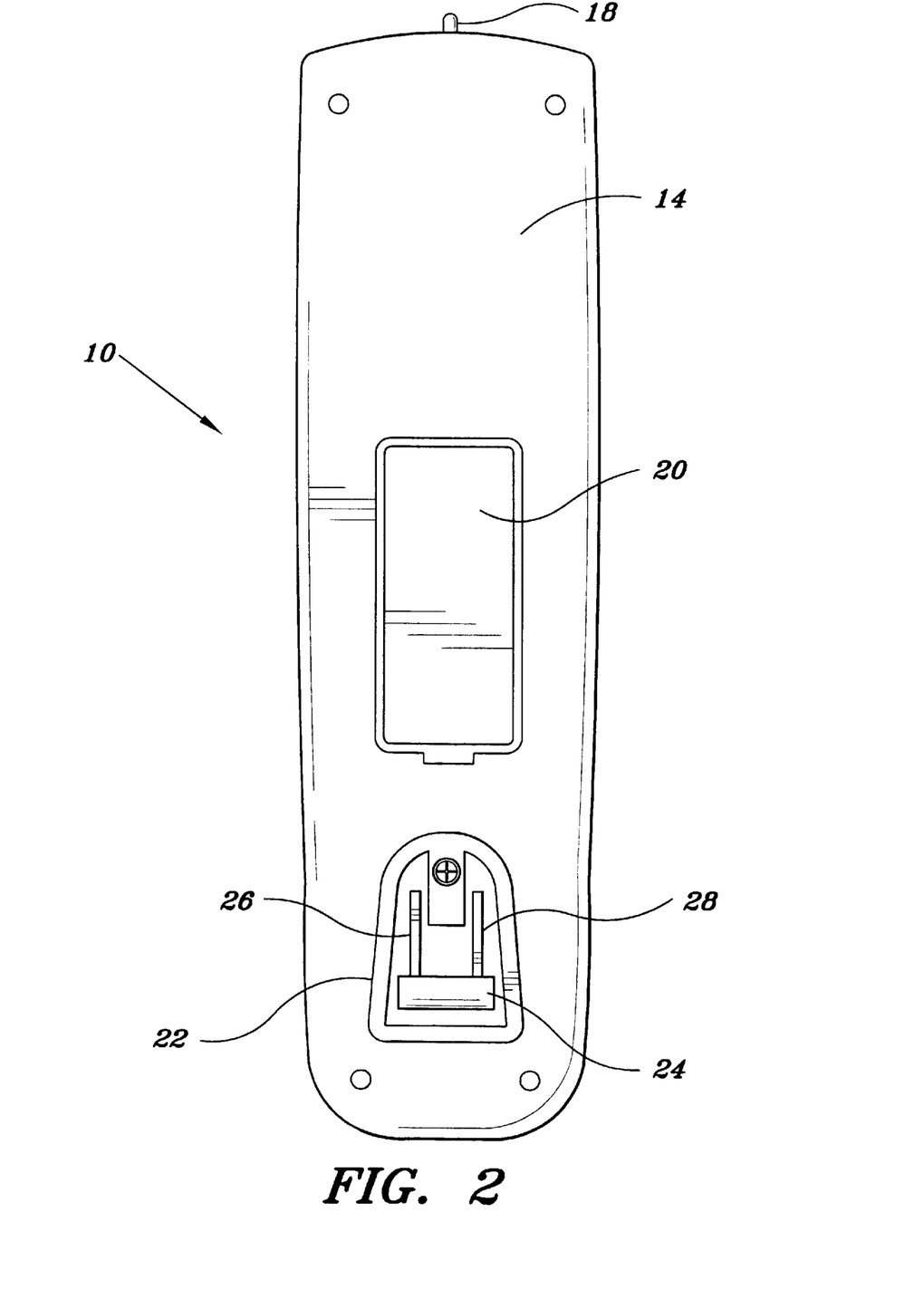
FIG. 2 is a bottom plan view of a rechargeable remote control according to the present invention.

Referring to FIGS. 1 and 2, the rechargeable remote control 10 has a housing which includes an upper housing panel 12 and a lower housing panel 14. The upper housing panel 12 includes a keypad 16 for executing various remote control commands. The remote control circuitry is mounted on a printed circuit board disposed within the housing. The remote control unit 10 may include an infrared diode 18 for transmitting commands to a TV, VCR, DVD, or other appliance. Alternatively, the remote control circuitry may provide for transmission of commands by ultrasonic or radio frequency signals. Various remote control circuits are well known in the art. The details of the remote control circuitry 10 do not define the novelty of the present invention, and will not be described further. The remote control circuitry is, however, supplied with power by rechargeable batteries accessed through a battery cover 20 covering an opening defined in the housing.

Figure 3:
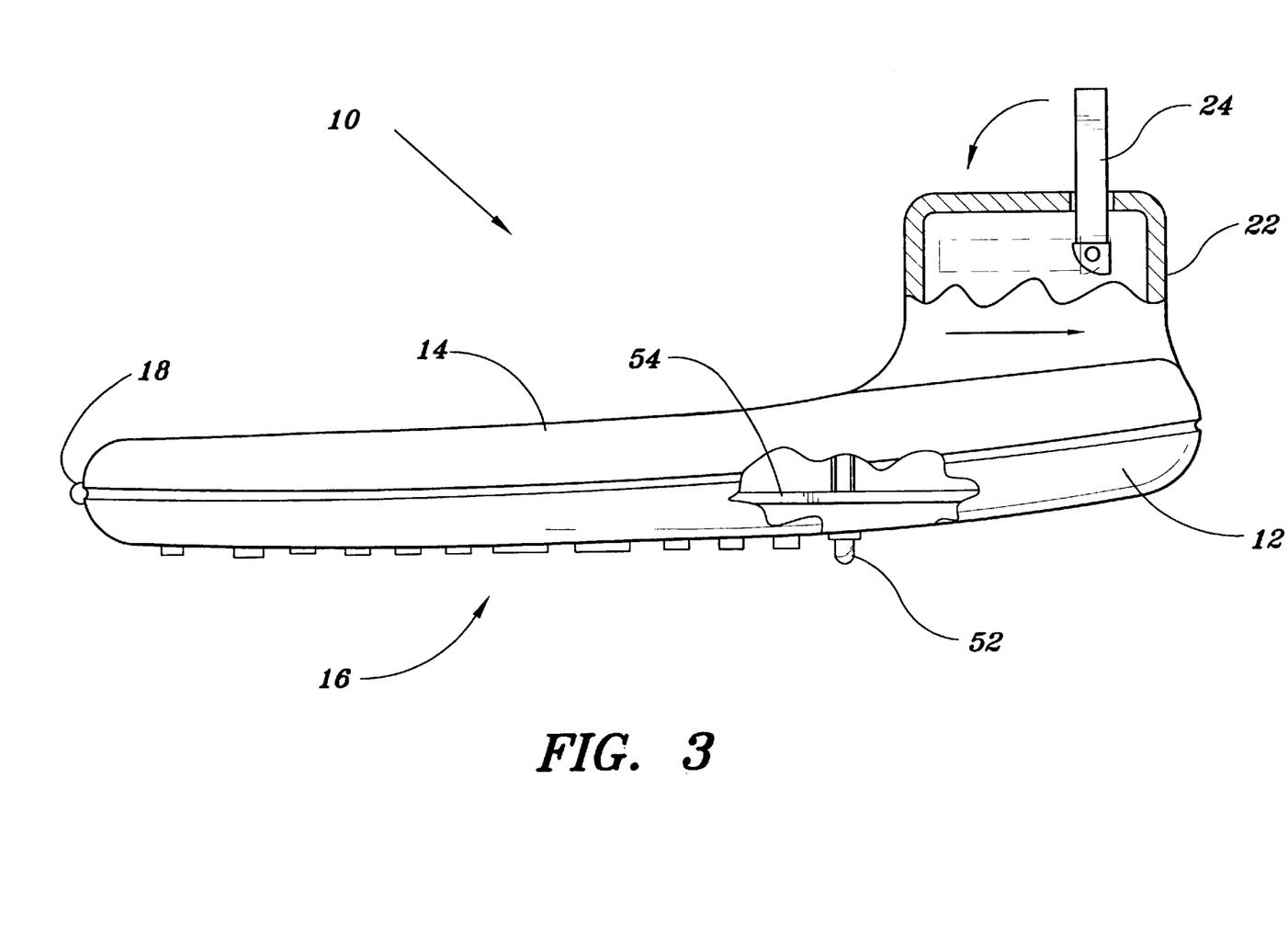
FIG. 3 is a side elevation view of a rechargeable remote control according to the present invention, the remote control being face down.

The lower housing panel 14 includes a housing 22 defining a recess for a retractable wall plug 24. The wall plug 24 is a two prong, polarized plug, so that the wall plug 24 can only be inserted into a wall outlet with the wide prong 26 fitting the wider neutral slot, and the narrow prong 28 fitting the narrower hot slot, to ensure that the a.c. voltage will be supplied to the charging circuit with the proper polarity. As shown in FIG. 3, the wall plug 24 rotates 90° between an extended position in which the prongs 26 and 28 are deployed for insertion into a wall outlet, and a retracted position (shown in dashed lines) in which the plug 24 is disposed within the housing 22.

Preferably, the rechargeable remote control 28 is supplied with power by two rechargeable AA nickel-cadmium (NiCad) batteries and the charging circuit is adapted for recharging conventional AA NiCad batteries. However, it will be understood that the scope of the present invention is intended to extend to a rechargeable remote control which is powered by any type of secondary battery, e.g. silver-cadmium, nickel-metal hydride, etc., which can be recharged by a charging circuit supplied with power from the a.c. power mains.

A conventional AA NiCad battery supplies 1.2 volts when fully charged and about 0.9 volts when discharged. The capacity of the battery may vary, but NiCads are commonly available with a capacity of 500 mAh to 600 mAh. Several charging circuits are available for recharging NiCad batteries which are suitable for use with the present invention. The following discussion presents a conventional charging circuit which is appropriate for the present invention for purposes of enabling the present invention. It will be understood, however, that any conventional charging circuit may be used with the rechargeable remote control 10 of the present invention. It is preferred, however, that the charging circuit be a charging circuit which does not employ a step-down transformer, due to the bulk of the transformer, which is not ergonomically suitable for use as a built-in charger for a remote control.

Figure 7:
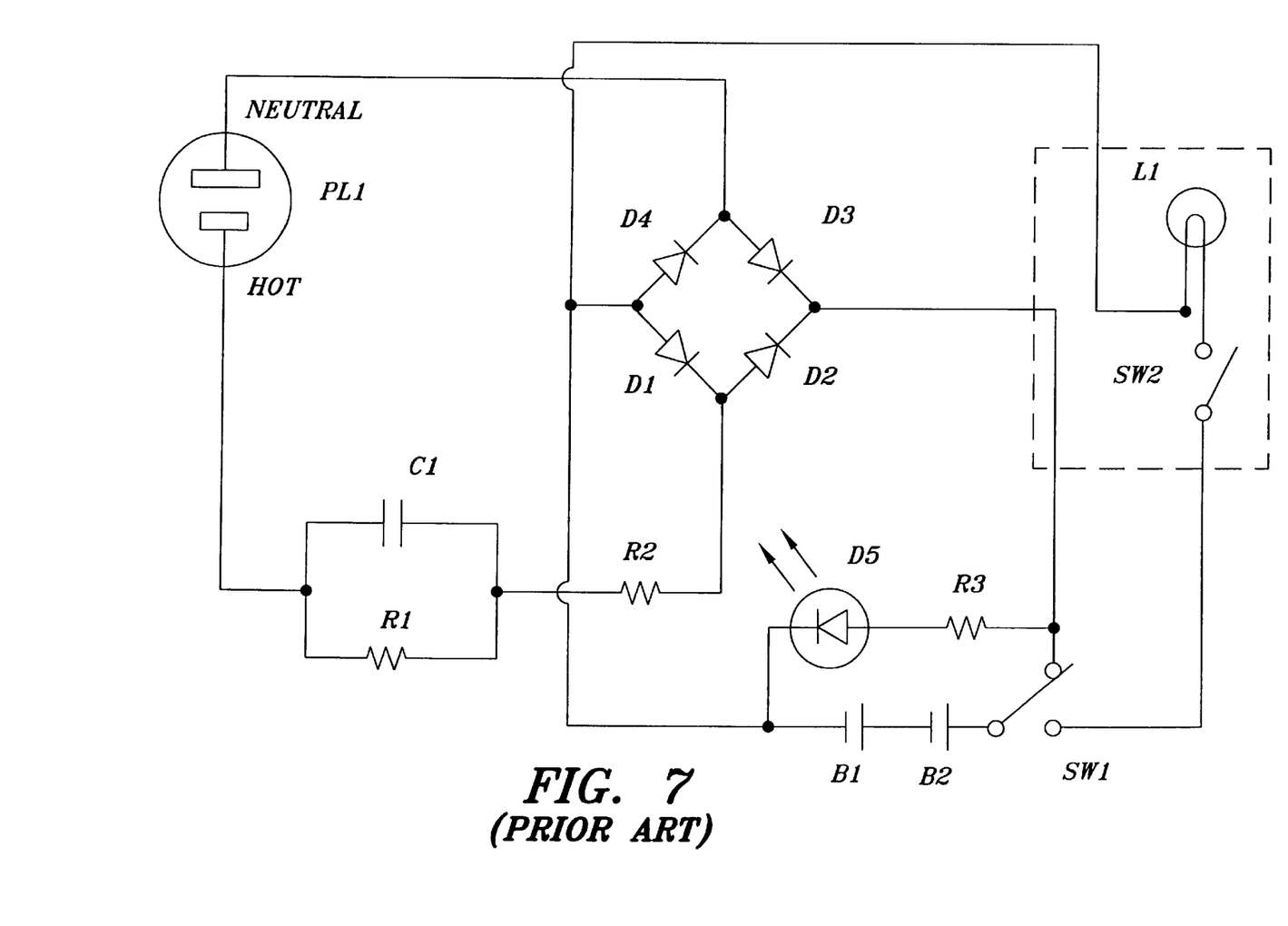
FIG. 7 is a schematic diagram of a prior art battery charging circuit.

An example of a suitable charging circuit is that used by the Coleman Company, Inc. of Wichita, Kans. in their rechargeable flashlight, Model No. 5387D700. A schematic diagram of the circuit is shown in FIG. 7. In the diagram, plug PL1 is the retractable plug 24. Resistors R1, R2, and capacitor C1 drop the voltage and current down to a suitable level. Diodes D1, D2, D3, and D4 form a conventional bridge rectifier circuit for converting alternating current to direct current. Batteries B1 and B2 are the two rechargeable AA NiCad batteries. The flashlight load is indicated by the dashed rectangle, and comprises flashlight bulb L1 and switch SW2, which is used to turn the flashlight on and off. The load is disconnected from the battery power supply during charging by switch SW1.

The operation of switch SW1 is explained by reference to FIGS. 4, 5 and 7. Switch SW1 is a single pole, double throw slide switch. The pole of switch SWI is connected to the positive terminal of battery B2. When the wall plug 24 is in the retracted position, as shown in FIG. 5, the throw is connected to the load, so that the batteries B1 and B2 supply current to lamp L1 when switch SW2 is closed. When the wall plug 24 is extended, the throw of switch SW1 is in the position shown in FIG. 7, thereby connecting batteries B1 and B2 to the charging circuit and disconnecting the load from the batteries to prevent damage to lamp L1, as well as an accidental current drain during charging. A pair of contacts connected to prongs 26 and 28 protrude rearward from the body of wall plug 24, mating with contacts in the housing 22 to connect the prongs 26 and 28 to the charging circuit with the wall plug 24 extended, and being disconnected from the charging circuit with the plug 24 retracted.

Figure 4:
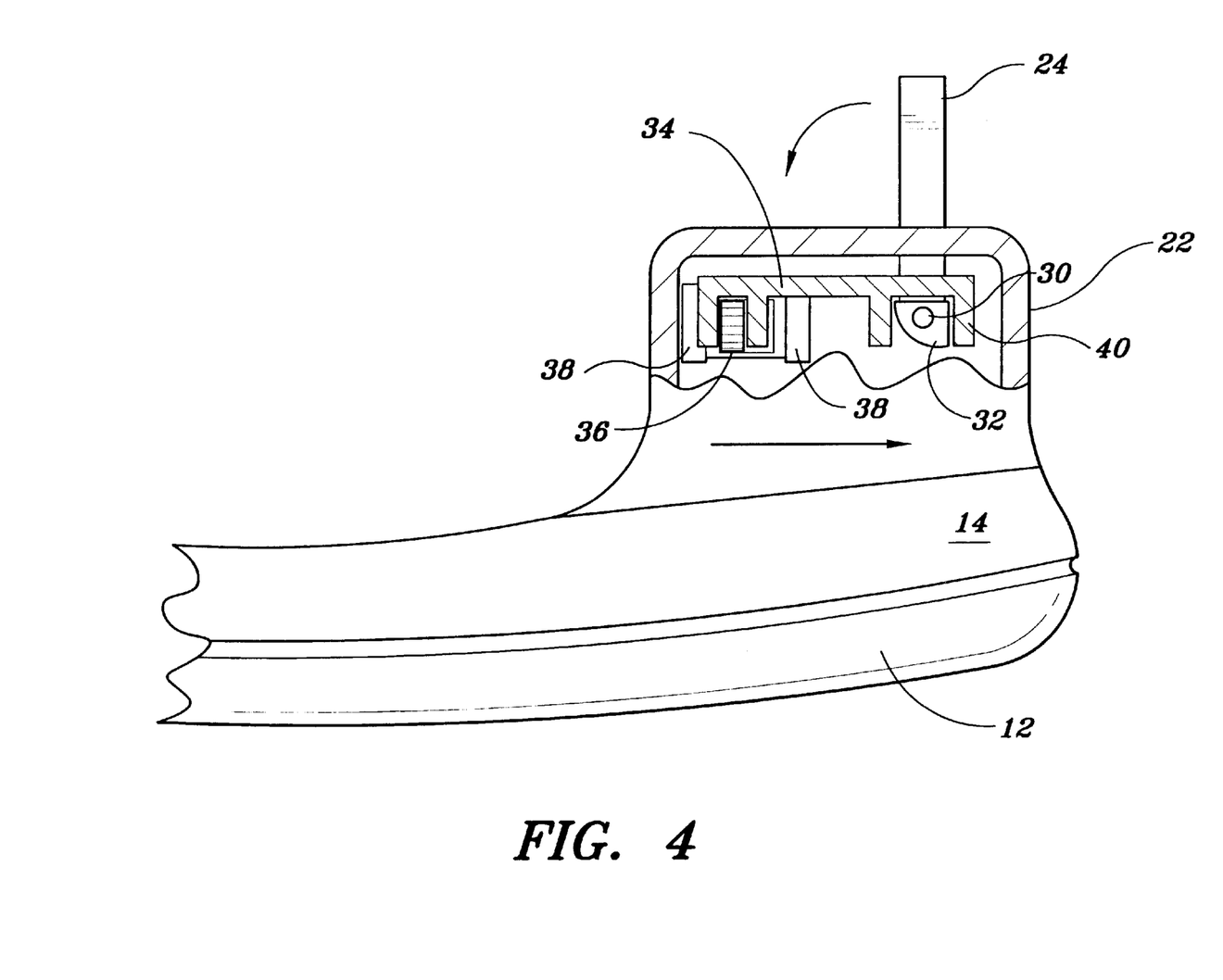
FIG. 4 is a fragmented elevation view of a rechargeable remote control according to the present invention with the housing partly broken away, partly in section, with the wall plug extended.
Figure 5:
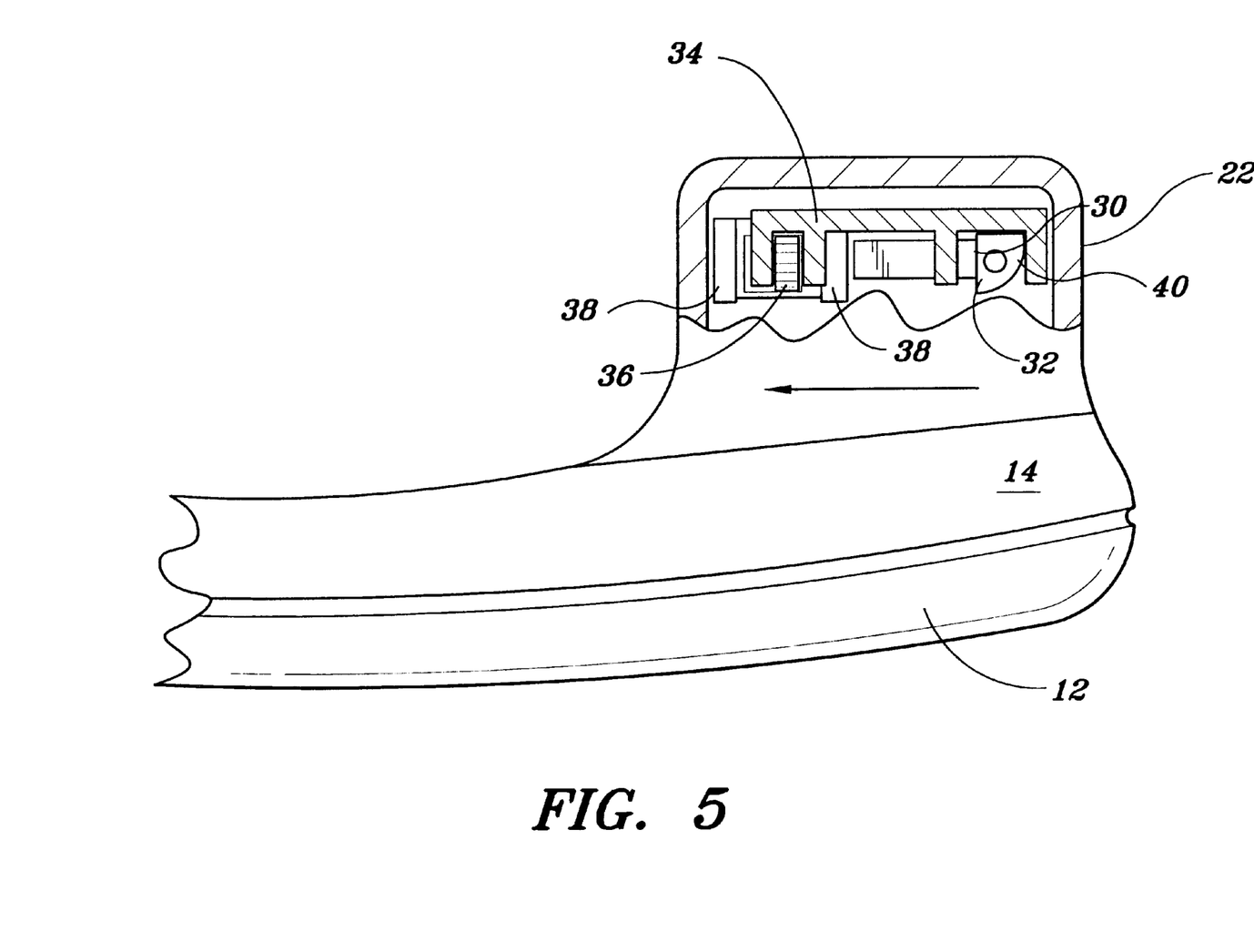
FIG. 5 is a fragmented elevation view of a rechargeable remote control according to the present invention with the housing partly broken away, partly in section, with the wall plug retracted.

As shown in FIGS. 4 and 5, wall plug 24 is mounted on a rotor 30 having a cam 32 at one end of the rotor 30. The cam 32 has the shape of a 90° sector of a circle, and is disposed in a pocket defined in a cam slide 34. The other end of the cam slide 34 has a second pocket which brackets the slide button 36 of switch SW1. The body of switch SW1 is firmly lodged between two stops 38. When the wall plug 24 is rotated to the extended position shown in FIG. 4 slide button 36 is in the forward position, so that the throw is connected to the charging circuit as shown in FIG. 7. The wall plug 24 can be rotated downward, as indicated by the curved arrow in FIG. 4. The cam 32 pushes against the rear wall 40 of the cam pocket, pushing the cam slide 34 rearward until the position shown in FIG. 5 is attained. In this position slide button 36 is in the rearward position, disconnecting the charging circuit from the batteries B1 and B2 and connecting lamp L1 and switch SW2 to the batteries B1 and B2. The wall plug 24 can be rotated to an upright position, as indicated by the curved arrow in FIG. 5, causing the cam 32 to bear upon the front wall 42 of the cam pocket, moving cam slide 34 forward until the position in FIG. 4 is attained.

Referring back to FIG. 7, diode D5 and current limiting resistor R3 are disconnected from a power source with plug 24 retracted, but when wall plug 24 is extended, the residual voltage in batteries B1 and B2 forward biases the diode D5 (preferably a red miniature LED) to conduct and provide an indicator light which signals that lamp L1 is disconnected from the batteries B1 and B2, and that the charging circuit is ready for operation.

The circuit of FIG. 7 produces a charging current with is a pulsing direct current of about 60 mA. The current drain for diode D5 reduces the effective charging current to about 50 mA. Representative values for the components are shown in Table 1.

| Component Values | |
|---|---|
| R1 | 470 kΩ, 1/2 watt |
| R2 | 10 Ω, 1/2 watt |
| R3 | 180 Ω, 1/2 watt |
| C1 | 1 μF, 250 V |
| D1, D2, D3, D4 | 1N4001 |
| B1, B2 | 1.2 V NiCad AA |
| L1 | 2.4 V, 500 mA |

Figure 6:
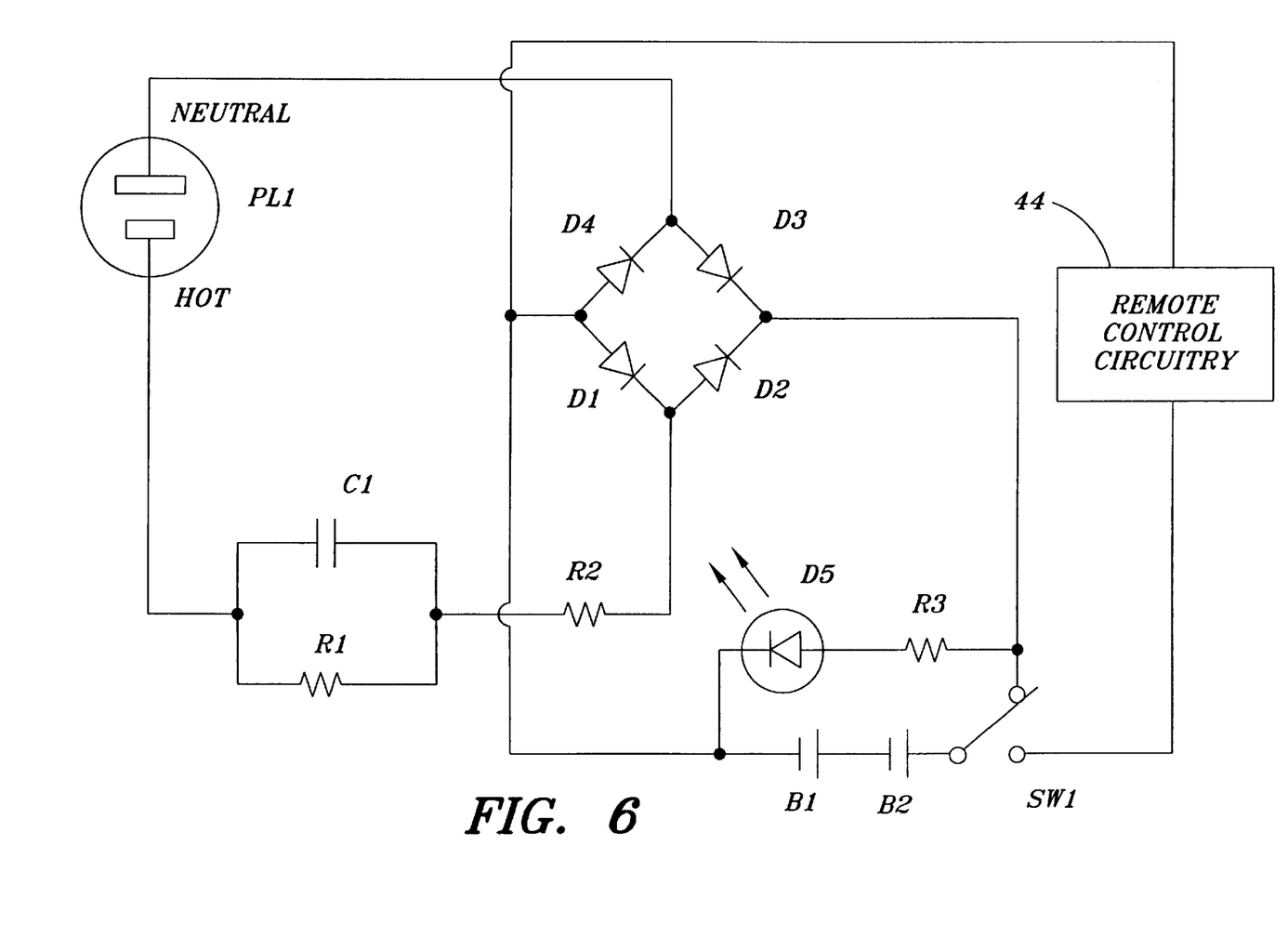
FIG. 6 is a schematic diagram of a charging circuit for a rechargeable remote control according to the present invention.

FIG. 6 shows how the circuit of FIG. 7 can be modified for use with the rechargeable remote control 10 of the present invention. The charging circuit in FIG. 7 is essentially the same as the charging circuit of FIG. 6, with the remote control circuitry 44 substituted for the load L1 and SW2. The rechargeable remote control 10 incorporates the mechanical mechanism shown in FIGS. 4 and 5 for operating switch SW1.

In the preferred embodiment diode D5 appears as indicator light 50 on the front panel 12, as shown in FIG. 1. When lit, indicator light 50 signals that wall plug 24 is locked in the extended position and that the remote control circuitry 44 has been disconnected from batteries B1 and B2 to protect the remote control circuitry from damage and to prevent current drain during charging, and that it is therefore safe to plug the rechargeable remote control 10 into a wall outlet. Optionally, the rechargeable remote control may include another LED indicator light 52, preferably a miniature green LED, on the front panel 12 to indicate that the batteries B1 and B2 are receiving charging current. Such charge indicator diodes are well known in the battery charging art, and the circuitry for adding charge indicator diode 52 will not be described further. The charger circuitry is mounted on a printed circuit board 54 (shown in FIG. 3) within the remote control housing, which may be the same circuit board that the remote control circuitry 44 is mounted on, or a separate circuit board, depending on the geometry of the housing.

It is to be understood that the present invention is not limited to the embodiments described above, but encompasses any and all embodiments within the scope of the following claims.

I claim:

1. A rechargeable remote control for remotely transmitting a command to a remote appliance, comprising:
   a) a remote control housing having an upper panel and a lower panel attached to the upper panel, said housing having a recess defined therein;
   b) remote control circuitry disposed within said housing;
   c) at least one rechargeable battery electrically connected to said remote control circuitry;
   d) a battery charging circuit disposed within said housing for recharging said at least one battery;
   e) a switch disposed within said housing having a first position connecting said at least one battery to said remote control circuitry and a second position connecting said at least one battery to said battery charging circuit; and
   f) a wall plug rotatably mounted on said housing, said wall plug having a pair of prongs adapted for insertion into an alternating current mains wall outlet, said wall plug being mechanically connected to said switch, said wall plug rotating between a retracted position wherein the plug is disposed within the recess defined in said housing with said switch in the first position, and an extended position wherein the prongs extend from said housing with said switch in the second position.

2. The rechargeable remote control according to claim 1, wherein said at least one battery comprises a nickel-cadmium battery.

3. The rechargeable remote control according to claim 1, wherein said at least one battery consists of two battery cells.

4. The rechargeable remote control according to claim 1, wherein said battery charger circuit is transformer-less.

5. The rechargeable remote control according to claim 1, wherein said battery charger circuit further comprises at least one optical indicator device for indicating when said remote control circuitry is disconnected from said at least one rechargeable battery.

6. The rechargeable remote control according to claim 1, further comprising an optical indicator device electrically connected to said battery charger circuit for indicating when said at least one rechargeable battery is being recharged.

* * * * *